United States Patent [19]
Long

[11] 3,747,893
[45] July 24, 1973

[54] FLUID COUPLING WITH SINK RETAINER

[75] Inventor: Olan L. Long, Columbus, Ohio

[73] Assignee: Westinghouse Electric Corporation, Pittsburgh, Pa.

[22] Filed: Jan. 17, 1972

[21] Appl. No.: 218,291

[52] U.S. Cl. ............ 251/148, 137/798, 285/174, 251/368
[51] Int. Cl. ..................... F16l 15/00, F16l 35/00
[58] Field of Search ............. 251/148, 141, 368; 137/798; 285/17 A, 177, 114, 287, 422

[56] References Cited
UNITED STATES PATENTS

| | | | |
|---|---|---|---|
| 1,639,446 | 8/1927 | Zannoth | 137/798 X |
| 3,647,177 | 3/1972 | Lang | 251/141 X |
| 3,220,753 | 11/1965 | Kasidas | 285/174 |
| 3,396,848 | 8/1968 | Kozel | 251/148 X |

Primary Examiner—William R. Cline
Attorney—F. H. Henson and E. C. Arenz

[57] ABSTRACT

A metal fitting particularly adaptable for use with a dishwasher water supply valve of the character having a plastic body is disclosed, in which the fitting includes a coupling ring which may be turned onto the inlet end of the supply valve, and includes a tubular body carrying the coupling ring and having an outwardly projecting plate at its inlet end serving as both a heat sink for heat applied upstream from the fitting on the metal water supply conduit, and retaining the coupling ring from disengagement off the inlet end of the fitting.

4 Claims, 3 Drawing Figures

PATENTED JUL 24 1973

3,747,893

FLUID COUPLING WITH SINK RETAINER

BACKGROUND OF THE INVENTION

1. Field of the Invention

This invention relates generally to the art of water supply systems for domestic dishwashers, and in particular to fittings therefor.

2. Description of the Prior Art

U.S. Pat. No. 3,195,561 discloses a bracket, fitting and plastic valve arrangement which is of a character which permits valves having plastic bodies to be used in under-counter dishwashers which are "plumbed-in" in the sense of a relatively permanent connection being made to the water supply system through a metal pipe. This arrangement has performed satisfactorily and has been widely used, but it is considered to be relatively expensive and is conventionally used with a plastic valve body which is considerably more expensive than the plastic valve body ordinarily provided for portable dishwashers.

The plastic valve body used for portable dishwashers has a male supply inlet to which a coupling ring of the ordinary garden hose type is coupled in the machine, with the opposite end of the rubber hose being user connected to and disconnected from a water tap in the kitchen. There is no functional reason of which I am aware that prevents the relatively less expensive plastic supply valve used in portable dishwashers from being used in an undercounter dishwasher. However, there is the problem, to which the noted patent is directed, of avoiding the undue application of torque to the plastic threads on the supply valve when the usual "plumbed-in" connection is made in coupling a metal supply conduit to the valve, and the problem of avoiding undue heat being transmitted to the plastic valve body when heat is applied in coupling to the metal supply conduit. It is the aim of my invention to provide a supply system arrangement including a metal fitting which avoids the problems in a relatively inexpensive way.

SUMMARY OF THE INVENTION

In accordance with my invention, the supply arrangement includes a water supply inlet valve having a plastic valve body including an integrally-molded, male supply inlet, a metal fitting for making the connection between the supply valve inlet and the metal supply conduit, the fitting including a tubular body carrying an interiorly threaded coupling ring in retained relation on its outlet end, the tubular body being interiorly threaded for at least a portion of its length at its inlet end, the fitting having outwardly-projecting means integral with the tubular body at or near the inlet end of the tubular body and serving as a heat sink for a heat applied to the supply conduit upstream from the fitting. With this arrangement, in the usual plumbing connection arrangement, a nipple is turned into the inlet end of the fitting and a coupling sleeve is soldered onto the adjoining ends of the water supply conduit and the nipple. The coupling ring is simply turned onto the plastic valve body male inlet end. It may be readily connected and disconnected for purposes of service. The outwardly projecting means at the inlet end of the fitting preferably has a perimetric shape accommodating the application of a tool to hold the fitting against rotation during the application of any torque to the upstream conduit.

DRAWING DESCRIPTION

DESCRIPTION OF THE PREFERRED EMBODIMENT

Figure 1:
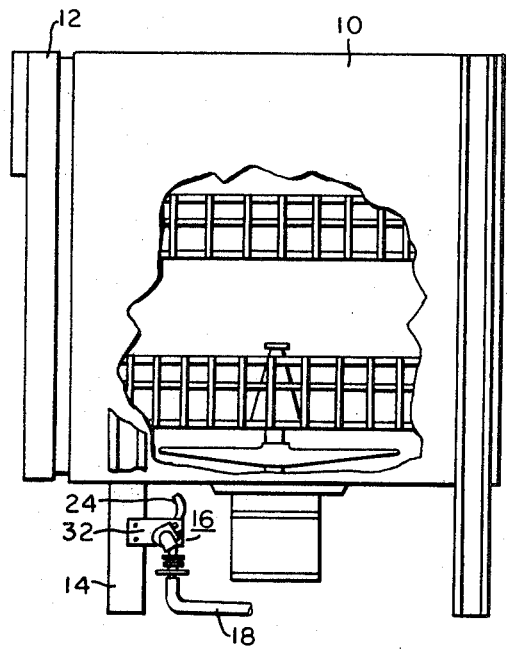
FIG. 1 is a partly broken side view of generally diagrammatic character of a dishwasher with the supply arrangement of the invention applied thereto.

The undercounter dishwasher of FIG. 1 includes a tub 10, a swing-down door 12 for the open front of the tub and four supporting legs 14.

Figure 2:
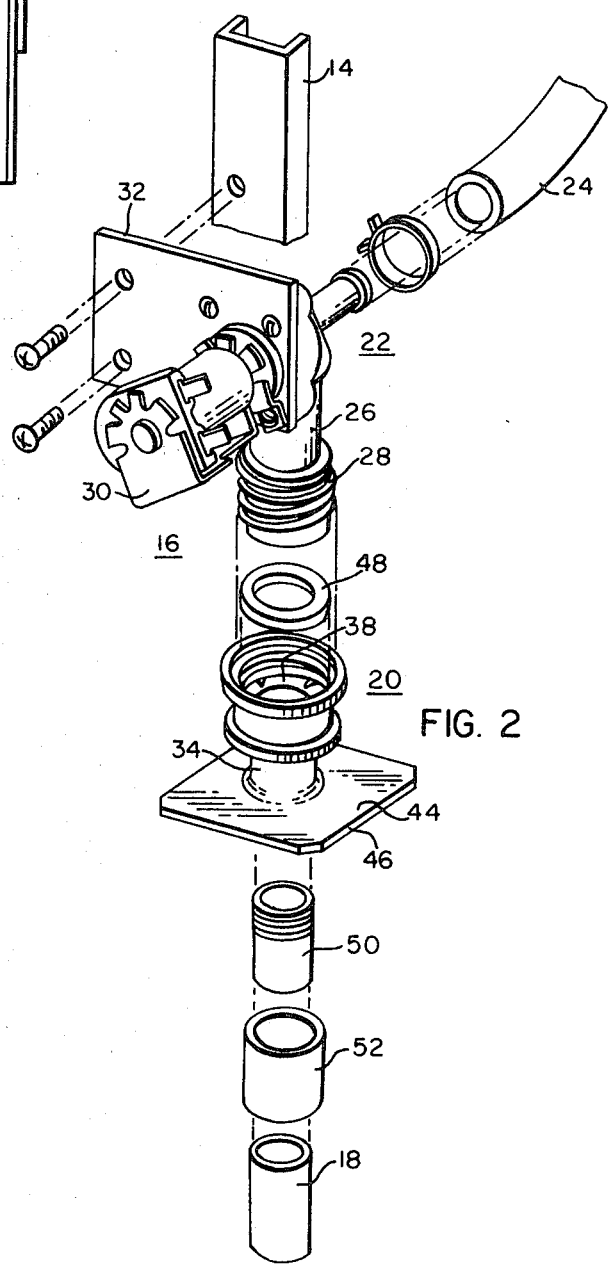
FIG. 2 is an exploded isometric view of the parts of the water supply system.

The parts of concern of the water supply arrangement are generally designated 16 in FIG. 1. The water supply conduit is typically a copper tube which extends from the house water supply to the dishwasher. It is connected to a metal fitting generally designated 20 (FIG. 2) which in turn is connected to the inlet of a solenoid-operated supply valve generally designated 22, the outlet of which is connected by a rubber tube 24 leading to a water inlet opening in the wall of the tub 10.

The supply valve 22 may be of the type available from and designated model S-30 by the Dole Valve Company. As such, the valve body 26 is of molded plastic and includes an integrally-molded, threaded, male inlet end 28 of a diameter and thread configuration adapting an ordinary garden hose coupling ring to be connected thereto. A solenoid 30 operates the valve and is connected to a metal plate 32 which in turn supports the valve and is secured to a supporting leg 14 to hold the supply valve assembly 22 in place. The solenoid is operated in conventional fashion by a timer (not shown) which controls the function of the dishwasher during the operating cycles of dishwasher. The supply valve assembly illustrated and described has conventionally been used for portable dishwashers for some time, and is relatively inexpensive.

Figure 3:
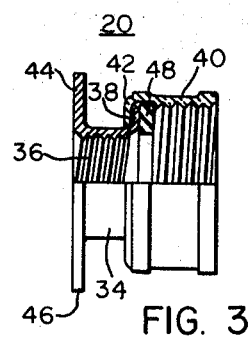
FIG. 3 is a half section of the metal fitting.

The metal fitting 20 (FIGS. 2 and 3) is provided to make the connection between the supply conduit 18 and the inlet valve 22. It includes a tubular body 34 which is interiorly threaded as at 36 for at least a portion of its length beginning at its inlet end, and has an outwardly-directed flange 38 at the outlet end of the tubular body. An interiorly threaded female coupling ring 40 of the ordinary garden hose type is rotatably retained on the outlet end of the tubular body by the inwardly-directed flange 42 which is adapted to engage with the flange 38 of the tubular body.

The fitting 20 also includes an outwardly projecting plate 44 located at the inlet end of the tubular body. The perimeter 46 of the plate is of generally square shape as illustrated to adapt it to conveniently accommodate the application of the tool to prevent rotation of the tubular body. A hose washer 48 for the coupling ring provides a watertight seal when the coupling ring is turned onto the inlet end 28 of the supply valve.

In one typical way of plumbing in the dishwasher, a nipple 50 is turned into the inlet end of the metal fitting 20 and a coupling sleeve 52 is provided to make a soldered connection between the supply conduit 18 and the nipple 50. During soldering, the plate 46 serves as a heat sink which dissipates the heat applied during the soldering operation and traveling through the nipple 50 to the metal fitting. This protects the hose washer 48 and the plastic body of the valve 22. It is preferable for purposes of serving as a heat sink that the plate 44 be at the extreme inlet end of the metal fitting. If the connection to the metal fitting is to be made by threaded fittings only without any soldering, the plumber grasps the plate 44 with a tool to prevent the application of torque through the metal fitting to the threads on the plastic valve.

The plate 44 also serves the function of preventing disengagement of the coupling ring 40 off the inlet end of the metal fitting.

If servicing of the dishwasher requires that the supply connection to the dishwasher be broken, this may be accomplished simply by turning the coupling ring off the inlet end of the plastic supply valve.

In an alternative embodiment not illustrated, and which is not the currently preferred form, the plate 44 may be extended and provided with means for attaching it to a leg 14 of the dishwasher. In this case, plate 32 would not include that portion which is attached to the leg 14. In this alternative embodiment, the valve would be supported from the fitting, rather than the fitting being supported from the valve. However, this alternative embodiment has the disadvantage that if the dishwasher is to be removed from its undercounter location, and there is a soldered connection between the supply conduit 18 and the fitting 20, the fitting would have to be loosened from its supporting leg for purposes of breaking the connection and moving the dishwasher from under the counter.

I claim as my invention:

1. In a dishwasher water supply system, the combination comprising:
   a water supply inlet valve having a plastic valve body including an integrally-molded, male supply inlet for said body; and
   a metal fitting for making a connection between said valve inlet and a metal supply conduit, said fitting including a tubular body having outwardly-directed flange means to retain, in rotatable relation on said tubular body outlet end, an interiorly-threaded coupling ring having inwardly-directed flange means at its inlet end for engagement with said outwardly-directed flange means of said tubular body,
   said coupling ring having a sealing washer therein, and being adapted to be turned onto said male supply inlet, said tubular body being threaded for at least a portion of its length at its inlet end,
   said fitting including outwardly-projecting means integral with said tubular body and spaced toward the inlet end of said tubular body from said outwardly-directed flange means to serve as a heat sink for any heat-applied bonding operation performed on said metal supply conduit, and
   said outwardly-projecting means has a perimeter of non-circular form to accommodate gripping said body with a tool to control rotation of said body.

2. In the combination of claim 1:
   said tubular body is interiorly threaded at its inlet end.

3. In the combination of claim 1:
   said outwardly-projecting means is disposed at the extreme inlet end of said tubular body.

4. For a dishwasher water supply system, a metal fitting for application to a plastic dishwasher supply valve having an integral threaded male supply inlet, said metal fitting comprising:
   a tubular body having outwardly-directed flange means to retain, in rotatable relation on said tubular body outlet end, an interiorly-threaded coupling ring having inwardly-directed flange means at its inlet end for engagement with said outwardly-directed flange means to prevent said coupling ring from being disengaged from said tubular body off the outlet end thereof;
   said tubular body being threaded for at least a portion of its length at its inlet end;
   said fitting including outwardly-projecting means integral with said tubular body, spaced toward the inlet end of said tubular body from said outwardly-directed flange means, to serve as a heat sink for any heat-applied bonding operation performed upstream from said fitting and also to serve to retain said ring from disengagement off the inlet end of said body,
   said tubular body is interiorly-threaded at its inlet end; and
   said outwardly-projecting means is located at the extreme inlet end of said body and is of non-circular perimeter to accommodate application of a tool thereto to hold said tubular body against rotation.

* * * * *